United States Patent [19]  [11] 3,915,913
Jackson, Jr. et al.  [45] *Oct. 28, 1975

[54] HOT MELT POLYMER BLENDS

[75] Inventors: Winston J. Jackson, Jr., Kingsport, Tenn.; William R. Darnell, Weber City, Va.

[73] Assignee: Eastman Kodak Company, Rochester, N.Y.

[ * ] Notice: The portion of the term of this patent subsequent to Mar. 5, 1991, has been disclaimed.

[22] Filed: Dec. 14, 1973

[21] Appl. No.: 425,046

Related U.S. Application Data

[63] Continuation-in-part of Ser. No. 280,930, Aug. 14, 1972, Pat. No. 3,795,644.

[52] U.S. Cl............. 260/22 D; 161/182; 161/214; 260/23 P; 428/349; 428/458
[51] Int. Cl.² .... C08G 63/02; C09J 3/16; C09J 7/00
[58] Field of Search ........... 260/22 D; 117/122 PA; 156/332; 428/349, 458

[56] References Cited
UNITED STATES PATENTS

| | | | |
|---|---|---|---|
| 3,091,600 | 5/1963 | Caldwell et al. | 260/33.4 R |
| 3,235,520 | 2/1966 | Crowell | 260/22 D |
| 3,644,267 | 2/1972 | Jackson et al. | 260/873 |
| 3,644,574 | 2/1972 | Jackson et al. | 260/873 |
| 3,657,389 | 4/1972 | Caldwell et al. | 260/873 |
| 3,795,644 | 3/1974 | Jackson et al. | 260/22 D |

FOREIGN PATENTS OR APPLICATIONS 998,654  7/1965  United Kingdom............... 260/22 D

*Primary Examiner*—Ronald W. Griffin
*Attorney, Agent, or Firm*—J. Frederick Thomsen; Daniel B. Reece, III

[57] ABSTRACT

Hot melt compositions having low melt viscosity and high adhesive strength, especially to metals, are disclosed. The compositions include a copolyester derived from a glycol having from 2 to 10 carbon atoms, terephthalic acid and dimer acid, blended with a polymeric material comprising a vinyl aromatic polymer derived from a monomer of the formula

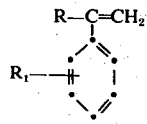

wherein R is hydrogen or an alkyl group containing 1 to 4 carbon atoms and $R_1$ is hydrogen, chlorine, alkyl from 1 to 4 carbon atoms or phenyl. It is especially useful as an adhesive or solder composition.

14 Claims, No Drawings

HOT MELT POLYMER BLENDS

This is a continuation-in-part of copending U.S. application Ser. No. 280,930, filed Aug. 14, 1972, now U.S. Pat. No. 3,795,644.

This invention relates generally to hot melt compositions, and more specifically, this invention relates to hot melt adhesive and solder compositions having a relatively low melt viscosity and improved adhesion to metals, especially oil-coated metals, comprising a blend of a polyester with a vinyl aromatic polymer.

Hot melt adhesive compositions are of importance because of their speed of application compared with other types of adhesives. No solvents must evaporate, no curing must take place, and strong adhesive bonds are obtained as soon as the adhesive cools. Polyesters have been found useful in hot melt adhesives. Many polyesters, however, have low adhesive strength, particularly peel strength, on various uncoated substrates such as aluminum, copper, steel, glass, etc., and on substrates coated with various materials, such as polyepoxide resins, vinyls, phenolics, alkyds, acrylics, etc. Another problem often encountered is that some hot melt adhesives lack the ability to maintain high adhesive strength after aging as well as the ability to maintain high bond strength under relatively high temperature conditions. Moreover, many hot melt adhesives, particularly crystalline high melting polyesters, have high melt viscosities, resulting in inferior flow and wetting properties and, therefore, must be applied at relatively high temperatures when used as hot melt adhesives. Also, in the appliance and automobile industries, high-performance, hot melt compositions having good adhesion to oil-coated metal substrates are very desirable. Steel substrates are often oil-coated to prevent oxide formation during manufacturing processes. It is desirable that these hot melt adhesives have a relatively low melt viscosity for ease of application. Such hot melt adhesive compositions can be used as a replacement for lead solder, and are much needed in the automobile industry as a gap filler because of toxicity problems associated with handling hot lead solder. In such applications, it is often preferred to use a filler in the compositions according to this invention.

In U.S. Pat. No. 3,657,389, hot melt adhesive blends of poly(tetramethylene terephthalate) and polystyrene are disclosed. The adhesion to certain metals of the polyester of particular inherent viscosity (I.V.) is increased by the addition of polystyrene. A similar I.V. poly(tetramethylene terephthalate) modified with 15-20 mole percent dimer acid has low adhesion on metals, but it has now been found that a dramatic increase in adhesion, especially to uncoated steel, occurs when this dimer acid-modified polyester is blended with polystyrene. In our copending U.S. application Ser. No. 280,930 filed Aug. 5, 1972, of which the present application is a continuation-in-part, hot melt adhesive compositions comprising a polyester derived mainly from 1,4-butanediol, terephthalic acid and dimer acid, blended with a vinyl aromatic polymer are disclosed.

Modification of terephthalate polyesters in the adhesive blends with dimer acid decreases the melt viscosity of the blend at any given I.V. and the decrease in melt viscosity increases with increasing dimer acid modification. In many instances a melt viscosity of less than about 1000 poise is desirable. A relatively low melt viscosity can be obtained by 20 mole percent dimer acid modification of poly(tetramethylene) terephthalate blended with 15 weight percent polystyrene. At dimer acid contents greater than about 40 mole percent, the blend of copolyester and vinyl aromatic polymer has decreased heat resistance, whereas in the range of about 5-20%, the adhesively bonded substrates may be used at temperatures up to about 100°C. Surprisingly, this blend, having an I.V. of 0.60, has good adhesion on metals compared to the blend without dimer acid. Since polystyrene alone has very poor adhesive properties and dimer acid-modified terephthalate polyesters also have poor adhesive properties, it is indeed surprising that blends of these two polymers exhibit such a remarkable improvement in adhesive properties.

It is, therefore, an object of this invention to provide hot melt adhesives with improved adhesion to various types of substrates, especially oil-coated metals.

Another object is to provide a hot melt adhesive composition having a relatively low melt viscosity.

A still further object is to provide a hot melt adhesive composition capable of maintaining high adhesive strength upon aging and the ability to maintain high bond strengths under relatively high temperature conditions.

A still further object is to provide laminated articles consisting of various substrates bonded with these compositions.

Another object of this invention is to provide a polyester hot melt adhesive derived from a blend of modified terephthalate polyesters and vinyl aromatic polymer.

Other objects are apparent elsewhere in this specification.

These objects have been obtained in accordance with the present invention through the discovery that terephthalate polyesters modified with dimer acid and blended with a vinyl aromatic polymer unexpectedly give greatly improved adhesion on substrates such as metal and oil-coated metal, low melt viscosity, outstanding bond strength as well as the ability to maintain high adhesion strength bonds upon aging. The preferred blend of 75-80% by weight copolyester in which the acid component contains about 20 mole percent dimer acid and 25-20 percent polystyrene shows little or no loss in peel or tensile shear strength on metals when aged 6 months at 23°C., 4 days at 50°C. or 1 day at 100°C.

The blend includes a copolyester and a vinyl aromatic polymer. The copolyester preferably has an I.V. of at least about 0.5 and is derived from A. a glycol component, at least about 80 mole percent of which is an aliphatic or cycloaliphatic glycol containing from 2 to 10 carbon atoms. Other glycols, aliphatic or alicyclic, straight or branched chain, containing 11 to 40 carbon atoms may also be included in the glycol component in amounts not exceeding about 20 mole percent, and B. an acid component of
  (1) dicarboxylic acid containing from 2 to 20 carbon atoms, at least about 80 mole percent of which is terephthalic acid. Other dicarboxylic acids, aliphatic, aromatic, or alicyclic, containing from 2 to 20 carbon atoms may also be included in this component in amounts not exceeding about 20 mole percent, and
  (2) a dimer acid component, as defined herein.

The acid component contains from about 60 to about 95 (preferably about 75 to about 90) mole percent of dicarboxylic acid (1) and from about 25 to about 5 (preferably about 25 to about 10) mole percent dimer acid (2). Where the major glycol component is 1,4-butanediol, however, the acid component may contain as much as 40 mole percent dimer acid. Since the dicarboxylic acid of 2–20 carbon atoms must be at least about 80 mole percent terephthalic, the minimum amount of terephthalic acid, based on the total acid content, is 48 mole percent. The blend further includes a vinyl aromatic polymer, preferably polystyrene. The blend comprises between about 50 and about 98% by weight of the copolyester described above and between about 2% and about 50% by weight of the vinyl aromatic polymer. Preferably the blend comprises between about 60 and about 80% by weight of the copolyester and between about 20 and about 40% by weight of the vinyl aromatic polymer.

The term "dimer acid" as used herein refers to a 36 carbon atom, long chain, aliphatic dicarboxylic acid. The preparation and structure of the dimer acids are described in *Journal of American Oil Chemists Society*, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

Although up to about 20 mole percent of the glycols and dicarboxylic acids other than 2–10 carbon aliphatic or alicyclic glycols and terephthalic acid may be used in the copolyester component of this invention if desired, it is preferred that the glycol and dicarboxylic acid portion be essentially 2–10 carbon atom glycols, and terephthalic acid. Glycols containing from 2 to 6 carbon atoms are preferred because of the higher melting points of their polyesters. Other suitable glycols are alicyclic and aliphatic glycols containing from 11 to 40 carbon atoms. The carbon chain may be straight or branched. Examples of preferred glycols include ethylene glycol; 1,6-hexanediol; 1,10-decanediol; 2,2-dimethyl-1,3-propanediol; 1,4-cyclohexanedimethanol; 1,4-cyclohexanediol; diethylene glycol; triethylene glycol and dimer glycol. Other suitable dicarboxylic acids are straight and branched chain aliphatic, alicyclic and aromatic acids containing from 2 to 20 carbon atoms including maleic, dimethylmalonic, adipic, 2-methyladepic, azelaic, sebacic, isophthalic, hexahydroterephthalic, hexahydroisophthalic, trans-1,4-cyclohexanedicarboxylic, 2,5-norbornanedicarboxylic and oxydipropionic acid.

The vinyl aromatic polymers used in the adhesive blends of the invention are prepared by conventional procedures from the corresponding monomers and contain at least 50 weight percent of polymer units derived from at least one monomer having the formula:

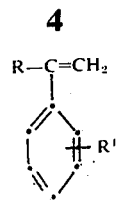

wherein R is hydrogen or an alkyl group containing 1 to 4 carbon atoms and $R^1$ is hydrogen or at least one member selected from the group consisting of chlorine, alkyl groups containing 1 to 4 carbon atoms, and phenyl.

The vinyl aromatic polymer may be a copolymer, block polymer, graft polymer, or blend containing up to 50 weight percent of polymer units derived from one or more of the following: olefins containing up to 12 carbon atoms (e.g., ethylene, propylene, butene, 4-methylpentene), butadiene, vinylnaphthalene, divinylbenzene, alkyl esters of acrylic and methacrylic acids wherein the alkyl groups contain from 1 to 4 carbons, acrylonitrile, methacrylonitrile, maleic anhydride, vinyl acetate, and other polymerizable compounds containing a —CH=C< group and which give copolymers which are stable under the extrusion and bonding conditions. Polystyrene is the preferred vinyl aromatic polymer. The inherent viscosity of the vinyl aromatic polymers used in the blends of the invention may vary from about 0.1 to 0.8 or more, but the preferred inherent viscosity is about 0.5 to about 0.8.

The copolyesters of this invention are prepared by conventional techniques, for example, by ester interchange of the glycol or glycols with the dimethyl ester of terephthalic acid and simultaneous direct esterification of the dimer acid in the presence of a titanium alkoxide catalyst. Copolyesters of the aliphatic or alicyclic glycols with terephthalic acid containing up to 50 mole percent or more of dimer acid having inherent viscosities of up to 1.5 can be prepared by this procedure. The preferred dimer acid content is 10–25 mole percent and the preferred inherent viscosity is 0.6–0.7 to obtain the desired low melt viscosity adhesive blends.

Blending of the polyesters with the vinyl polymers and other additives, if used, may be carried out by various common procedures, including mechanical mixing of the particles, blending on hot rolls, mixing in the melt, or mixing in solution and then removing the solvent. A satisfactory procedure is to stir the two polymers together under an inert atmosphere in a flask immersed in a metal bath. A preferred method is to blend the polymer in powder or granular form and extrude with a screw-type extruder.

Substances which may be laminated by the adhesives of this invention include metals (such as steel, iron, aluminum, chromium, copper, brass, bronze, nickel, zinc, titanium, and tin), wood, glass, ceramic materials, paper, cardboard, and fabrics. Substrates coated with a synthetic resin such as polyepoxide resin, epoxy-phenolic resin, melamine resin, phenolic resin, alkyd resin, a vinyl, or an acrylic coating also may be laminated with the blends of this invention. The same or different materials may be laminated in one structure. It is generally advisable to clean the surfaces of the components to be laminated just prior to formation of the melt adhesive bonds to remove foreign matter, grease, oxide coatings, etc., which might interfere with the formation of strong bonds.

The polyester adhesive may be applied in molten form with a spatula or regular extrusion equipment to the surfaces of the components to be laminated. Alternatively, a film of the polyester (2 to 6 mils in thickness) may be placed between the surfaces. After application of the polyester, the surfaces are clamped together with a pressure of several pounds per square inch and heat is applied by placing the clamped structure in a forced-air oven about 20° to 50°C. above the softening range of the polyester. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Fillers, pigments, processing aids, metal powders and glass cloth may be incorporated in the adhesive layer to increase the bonding strength and temperature resistance. Fillers and pigments, such as very finely divided silica, iron powder, alumina, talc or calcium carbonate, also affect the degree of crystallinity and the size of the spherulites. From 1 to 50% by weight may be added. Additives or processing aids may be used to further decrease the melt viscosity of the blends for more ease of application. Such processing aids are disclosed in U.S. Pat. No. 3,644,267, and terphenyl is preferred. Antioxidants and stabilizers also may be incorporated in the polymers to improve the thermal and oxidative stability at elevated temperatures.

The examples which follow are submitted for a better understanding of the invention. In the examples, the polyester component is prepared by conventional procedures from dimethyl terephthalate, 1,4-butanediol and dimer acid in the presence of titanium tetraisopropoxide catalyst. One hundred fifty ppm. of the catalyst are used, based on the weight of the copolyester. The vinyl aromatic polymers are prepared by conventional procedures from the corresponding monomers.

The polyester and vinyl monomer blends are prepared by physically mixing 2–3 mm. particles of the two polymers and melt extruding at about 180°C.–320°C., depending upon the particular polyester used, into a small rod. The rod is then chopped into ⅛-inch pellets. The vinyl aromatic monomer used in the adhesive blends of Table 1 is polystyrene having an I.V. of 0.72.

The T-peel strengths are determined on 6-mil tin-free steel (TF steel); 6.5-mil chrome-coated steel; and on 12-mil aluminum. They are measured in accordance with ASTM D1876 but using precut (1-in. wide) specimens. The steel specimens are degreased by washing three times with a suitable detergent, such as a solution of Alconox detergent (Alconox, Inc.) and rinsing in water each time. The aluminum specimens are cleaned by immersing in glacial acetic acid at 80°C. for 1 hour and rinsing well in water. The steel and aluminum specimens are then rinsed in acetone and allowed to dry in the air. To determine T-peel strengths on clean metals, these air-dried specimens are used. To determine T-peel strengths on oil-coated metals, the air-dried specimens are generously coated with an oil emulsion used by the automobile companies to prevent rusting, and then the excess is removed by wiping with clean tissue paper. Similar adhesive results are obtained when "Three in One" household oil, manufactured by Boyle-Midway Inc., New York, N.Y., is used instead of the oil emulsion.

To prepare an adhesive bond, a specimen is heated sufficiently on a hot plate for the adhesive blend to melt (applied as 20-mesh to ⅛-inch particles or by rubbing a large piece back and forth). A hot plate temperature of 280°C. is used. After the molten polymer is evenly spread on the specimen over a 2-inch length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 20 seconds). Then the specimen is placed on the laboratory bench and rubbing continued for about 10 seconds longer while the adhesive cools. This method of forming the adhesive bonds gives reproducible results similar to those obtained by clamping the specimens together and heating in a forced-air oven 20° to 50°C. above the polymer melting point. Glue lines are about 3 to 5 mils in thickness.

The melt viscosities of the copolyester/polystyrene blends of the examples are determined at 240°C. and 500 seconds$^{-1}$ using a Sieglaff-McKelvey Rheometer, Model R-64, according to ASTM D1703. Similar melt viscosities are obtained with the blends containing the polystyrene copolymers of Table 2.

Parts and percentages are by weight and temperatures are in degrees Centigrade unless otherwise specified. All inherent viscosities are determined at 25°C. using 0.25 gram of polymer per 100 ml. of a solvent consisting of 60 percent by weight phenol and 40 percent by weight tetrachloroethane.

A relatively low melt viscosity, hot melt adhesive is highly desirable because of ease of application. Table 1, containing Examples 1–22, illustrates the effect of dimer acid concentration in the copolyester, and polystyrene concentration in the blend. Example 3 in Table 1 illustrates the T-peel strength of 0.62 I.V. poly(tetramethylene terephthalate) blended with 15% polystyrene. Example 5 illustrates the substantial improvement in the T-peel strength when the I.V. of the poly(tetramethylene terephthalate) in the blend is 1.15. A particular disadvantage of the composition of Example 5, however, is the extremely high melt viscosity of 3640 poise; the 0.96 blend I.V. is less than the 1.15 polyester I.V. because of the presence of 0.72 I.V. polystyrene and a slight loss in I.V. on determination of the melt viscosity. The melt viscosity of a blend having an I.V. of 0.61 (Example 3 in Table 1) is substantially lower (665 poise), but the peel strength is appreciably lower.

Modification of the poly(tetramethylene terephthalate) in the adhesive blends with dimer acid decreases the melt viscosity of the blend at any given I.V., and the decrease in melt viscosity increases with increasing dimer acid modification. Examples 3 and 17 in Table 1 illustrate the relatively low melt viscosity which can be obtained by 20 mole percent dimer acid modification of poly(tetramethylene terephthalate) blended with 15 weight percent polystyrene. Surprisingly, this blend, having an I.V. of only 0.60, has high T-peel strength on metals (Example 17 in Table 1), compared to Example 3 without dimer acid.

Since polystyrene alone has almost no T-peel strength (Example 1) and the dimer acid modified poly(tetramethylene terephthalate) has low T-peel strength (Examples 6, 8, and 14), it is very surprising that blends of these two polymers exhibit such a remarkable improvement in the T-peel strength. Note that only 5 weight percent polystyrene in Example 15 produces a dramatic increase in peel strength on chrome-coated steel.

The increase in T-peel strength imparted by the polystyrene is appreciably less when no dimer acid component is present (Examples 2, 3 and 4, 5). Also, the peel strength on tin-free steel is comparatively low, even when the polyester I.V. is high (Example 5). When the polymer I.V.'s are the same or similar, the dimer acid modified copolyesters blended with polystyrene have appreciably lower melt viscosities and significantly higher T-peel strengths than the same compositions containing no dimer acid component.

polystyrene copolymer. Poly(tetramethylene terephthalate) modified with 15 mole percent of dimer acid (I.V. 0.61) is used in all blends.

These examples show that a significant improvement in peel strength is obtained even when the polystyrene I.V. is only 0.10 but that better results are obtained with higher I.V.'s. The data further illustrate that polystyrene copolymers are also effective in improving the peel strength. Similar improvement in peel strength is obtained when the copolyester is modified with 15 mole percent of isophthalic acid or 15 mole percent of ethylene glycol in addition to the dimer acid.

The following examples of Table 3 illustrate the ef-

Table 1

| Example | Dimer Acid, Mole % | Polyester I.V. | Polystyrene, Wt. % | Blend I.V. | Melt Viscosity, Poise | T-Peel Strength at 23°C., Lb./in. Width | | |
|---|---|---|---|---|---|---|---|---|
| | | | | | | Aluminum | TF Steel | Chrome-Coated Steel |
| 1 (Control) | — | — | 100 | — | — | 0.7 | <0.5 | <0.5 |
| 2 (Control) | 0 | 0.62 | 0 | 0.61 | 450 | 1.3 | 1.2 | 10 |
| 3 (Control) | 0 | 0.62 | 15 | 0.61 | 665 | 1.3 | 1.7 | 27 |
| 4 (Control) | 0 | 1.15 | 0 | — | — | 7 | 1.7 | 26 |
| 5 (Control) | 0 | 1.15 | 15 | 0.96 | 3640 | 25 | 8 | 45 |
| 6 (Control) | 5 | 0.72 | 0 | — | — | 5 | 10 | 7 |
| 7 | 5 | 0.72 | 15 | 0.68 | 900 | 7 | 7 | 53 |
| 8 (Control) | 15 | 0.60 | 0 | — | — | 1 | 2 | 5 |
| 9 | 15 | 0.60 | 15 | 0.62 | 500 | 8 | 5 | 42 |
| 10 | 15 | 0.60 | 20 | 0.63 | 560 | 18 | 35 | 46 |
| 11 | 15 | 0.63 | 40 | 0.65 | 770 | 16 | 29 | 31 |
| 12 | 15 | 0.63 | 45 | — | — | 16 | 20 | 18 |
| 13 | 15 | 0.73 | 20 | 0.72 | 915 | 19 | 31 | 58 |
| 14 (Control) | 20 | 0.60 | 0 | — | — | 3 | 4 | 5 |
| 15 | 20 | 0.60 | 5 | — | — | 8 | 25 | 43 |
| 16 | 20 | 0.60 | 10 | 0.62 | 300 | 14 | 39 | 48 |
| 17 | 20 | 0.60 | 15 | 0.60 | 290 | 13 | 33 | 43 |
| 18 | 20 | 0.60 | 20 | 0.62 | 330 | 13 | 34 | 36 |
| 19 | 20 | 0.63 | 25 | 0.63 | 475 | 16 | 37 | 38 |
| 20 | 20 | 0.63 | 40 | — | — | 15 | 22 | 21 |
| 21 (Control) | 35 | 0.70 | 0 | — | — | 10 | 23 | 16 |
| 22 | 35 | 0.70 | 25 | 0.67 | 735 | 13 | 17 | 26 |

Table 2 illustrates the effects on the T-peel strength on tin-free steel at 23°C. of (A) the I.V. of the polystyrene, including copolymers, and (B) the composition of the polystyrene copolymer.

fectiveness of adhesive blends according to this invention wherein different glycols are used, as well as varying amounts of dimer acid and aromatic vinyl polymer.

Table 2

| Example | Polystyrene Polymer or Copolymer | | | T-Peel Strength on TF-Steel, Lb./In. Width |
|---|---|---|---|---|
| | Comonomer | I.V. | Amt., Wt. % | |
| 23 (Control) | — | — | 0 | 2 |
| 24 | None | 0.10 | 35 | 18 |
| 25 | None | 0.28 | 35 | 25 |
| 26 | None | 0.58 | 35 | 28 |
| 27 | None | 0.72 | 35 | 30 |
| 28 | 10 wt. % Acrylonitrile | 0.65 | 35 | 19 |
| 29 | 12 wt. % α-Methylstyrene | 0.56 | 35 | 23 |
| 30 | 20 wt. % Butadiene | 0.81 | 35 | 20 |
| 31 | 5 wt. % Methyl acrylate | 0.52 | 35 | 25 |
| 32 | 15 wt. % Vinyl acetate | 0.73 | 35 | 18 |

Table 3

| Example | Blend Description | | | | T-Peel at 23°C. on TF-Steel, Lb./In. Width | |
|---|---|---|---|---|---|---|
| | Glycol | Dimer Acid, Mole % | Polyester I.V. | Polystyrene, Wt. % | Clean | Oily |
| 33 (Control) | Ethylene glycol | 0 | 0.60 | 0 | 5 | 1 |
| 34 (Control) | Ethylene glycol | 0 | 0.60 | 20 | 19 | 2 |
| 35 (Control) | Ethylene glycol | 20 | 0.57 | 0 | 16 | 1 |
| 36 | Ethylene glycol | 20 | 0.57 | 1 | 22 | 7 |
| 37 | Ethylene glycol | 20 | 0.57 | 5 | 22 | 20 |
| 38 | Ethylene glycol | 20 | 0.57 | 10 | 23 | 20 |
| 39 | Ethylene glycol | 20 | 0.57 | 20 | 19 | 16 |
| 40 | Ethylene glycol | 20 | 0.57 | 30 | 22 | 16 |
| 41 | Ethylene glycol | 20 | 0.57 | 40 | 18 | 15 |
| 42 (Control) | 1,4-Butanediol | 0 | 1.0 | 0 | 2 | 1 |
| 43 (Control) | 1,4-Butanediol | 0 | 1.0 | 15 | 9 | 2 |

Table 3 — Continued

| Example | Glycol | Blend Description | | | T-Peel at 23°C. on TF-Steel, Lb./In. Width | |
| --- | --- | --- | --- | --- | --- | --- |
| | | Dimer Acid, Mole % | Polyester I.V. | Polystyrene, Wt. % | Clean | Oily |
| 44 (Control) | 1,4-Butanediol | 20 | 0.79 | 0 | 9 | 2 |
| 45 | 1,4-Butanediol | 20 | 0.79 | 1 | 15 | 4 |
| 46 | 1,4-Butanediol | 20 | 0.79 | 5 | 19 | 15 |
| 47 | 1,4-Butanediol | 20 | 0.79 | 10 | 21 | 16 |
| 48 | 1,4-Butanediol | 20 | 0.79 | 25 | 24 | 17 |
| 49 | 1,4-Butanediol | 20 | 0.79 | 35 | 15 | 13 |
| 50 | 1,4-Butanediol | 20 | 0.79 | 40 | 15 | 12 |
| 51 (Control) | 1,6-Hexanediol | 0 | 0.84 | 0 | 4 | 2 |
| 52 (Control) | 1,6-Hexanediol | 0 | 0.84 | 20 | 39 | 7 |
| 53 (Control) | 1,6-Hexanediol | 5 | 0.72 | 0 | 5 | 3 |
| 54 | 1,6-Hexanediol | 5 | 0.72 | 20 | 40 | 4 |
| 55 (Control) | 1,6-Hexanediol | 10 | 0.63 | 0 | 6 | 5 |
| 56 | 1,6-Hexanediol | 10 | 0.63 | 5 | 23 | 19 |
| 57 | 1,6-Hexanediol | 10 | 0.63 | 20 | 37 | 29 |
| 58 | 1,6-Hexanediol | 10 | 0.63 | 30 | 28 | 24 |
| 59 | 1,6-Hexanediol | 10 | 0.63 | 35 | 24 | 24 |
| 60 (Control) | 1,4-Cyclohexanedimethanol | 0 | 0.83 | 0 | 2 | 1 |
| 61 (Control) | 1,4-Cyclohexanedimethanol | 0 | 0.83 | 20 | 4 | 2 |
| 62 (Control) | 1,4-Cyclohexanedimethanol | 20 | 0.58 | 0 | 2 | 3 |
| 63 | 1,4-Cyclohexanedimethanol | 20 | 0.58 | 20 | 15 | 7 |
| 64 (Control) | 1,4-Cyclohexanedimethanol | 0 | 0.64 | 0 | 2 | 1 |
| 65 | 1,4-Cyclohexanedimethanol | 25 | 0.64 | 30 | 12 | 6 |

Table 4

| Example | Polyester | Adhesive Blend Description | | | T-Peel at 23°C. on Aluminum Lb./In. Width | |
| --- | --- | --- | --- | --- | --- | --- |
| | | Dimer Acid, Mole % | Polyester I.V. | Polystyrene, Wt. % | Clean | Oily |
| 66 (Control) | Poly(ethylene terephthalate) | 20 | 0.57 | 0 | 16 | 6 |
| 67 | Poly(ethylene terephthalate) | 20 | 0.57 | 20 | 36 | 19 |

Example 33 in Table 3 shows the poor T-peel strength obtained on both clean and oily TF-steel of poly(ethylene terephthalate) containing no polystyrene or dimer acid modification (5 lb./in. width or less). When 20 weight percent polystyrene is blended with the poly(ethylene terephthalate) (Example 34), the T-peel strength on clean TF-steel is increased by a factor of 3–4, but the T-peel strength on oily TF-steel is not significantly affected. Similar results are obtained when the poly(ethylene terephthalate) is modified with 20 mole percent dimer acid, but is not blended with polystyrene (Example 35). When the poly(ethylene terephthalate) is modified with 20 mole percent dimer acid and also blended with 1–40 weight percent polystyrene (Examples 36–41), the T-peel strength on oily TF-steel is increased by a factor of about 10 over that of Examples 33, 34, and 35. Data concerning the T-peel strengths of similar adhesive blends, based upon the polyterephthalates of 1,4-butanediol, 1,6-hexanediol, and 1,4-cyclohexanedimethanol, are given in the other examples of Table 3.

Examples 53 and 54 in Table 3 show that, at the dimer acid content of 5 mole percent, the T-peel strength of dimer acid-modified poly(hexamethylene terephthalate) on oil-coated, tin-free steel is not improved by blending with 20 weight percent polystyrene, but the T-peel strength on clean tin-free steel is increased by a factor of eight when 20 weight percent polystyrene is added. These two examples illustrate the novelty of polyester/polystyrene blends containing less than 10 mole percent dimer acid, even though the T-peel strength on oil-coated steel is not improved when polystyrene is added.

Examples 66–67 (Table 4) show improved T-peel strength on oily aluminum. Examples 35 and 39 in Table 3 are repeated except clean and oily aluminum substrates are used.

Examples 68–71 illustrate the improved T-peel strength of 1,4-cyclohexanedimethanol copolyester/polystyrene blends when the copolyesters contain three dicarboxylic acid moieties.

Table 5

Adhesion of 1,4-Cyclohexanedimethanol Polyesters

| Example | Adhesive Blend Description | | | T-Peel at 23°C. on TF-Steel, Lb./In. Width | |
| --- | --- | --- | --- | --- | --- |
| | Description of Acid Moieties, Mole % | Polyester I.V. | Polystyrene Wt. % | Clean | Oily |
| 68 (Control) | 80% terephthalate 10% dimerate 10% isophthalate | 0.61 | 0 | 2 | 1 |
| 69 | Same as Example 68 | 0.61 | 20 | 17 | 10 |

Table 5 — Continued

Adhesion of 1,4-Cyclohexanedimethanol Polyesters

| Example | Adhesive Blend Description | | | T-Peel at 23°C. on TF-Steel, Lb./In. Width | |
|---|---|---|---|---|---|
| | Description of Acid Moieties, Mole % | Polyester I.V. | Polystyrene Wt. % | Clean | Oily |
| 70 (Control) | 80% terephthalate 10% dimerate 10% sebacate | 0.57 | 0 | 4 | 2 |
| 71 | Same as Example 70 | 0.57 | 20 | 13 | 7 |

Examples 72 and 73 illustrate the improved T-peel strength of the copolyester/polystyrene blends when the copolyester contains two dicarboxylic acid and two glycol moieties.

Table 6

Adhesion of Copolyester/Polystyrene Blends

| Example | Description of Copolyester | | Polyester I.V. | Polystyrene, Wt. % | T-Peel at 23°C. on TF-Steel Lb./In. Width | |
|---|---|---|---|---|---|---|
| | Dicarboxylic Acid Moieties, Mole % | Glycol Moieties Mole % | | | Clean | Oily |
| 72 (Control) | 90% terephthalate 10% dimerate | 90% 1,4-Cyclo-hexanedimethanol 10% 1,10-Decane-diol | 0.63 | 0 | 3 | 2 |
| 73 | Same as Example 72 | Same as Example 72 | 0.63 | 20 | 16 | 9 |

Examples 74 through 83 (Table 7) illustrate the effects on the T-peel strength on clean and oil-coated, tin-free steel at 23°C. of (A) the I.V. of the polystyrene, including copolymers, and (B) the composition of the polystyrene copolymer. Poly(hexamethylene terephthalate) modified with 10 mole percent of dimer acid (I.V. 0.63) is used in all blends.

Table 7

| Example | Polystyrene Polymer or Copolymer | | | T-Peel at 23°C. on TF-Steel, Lb./In. Width | |
|---|---|---|---|---|---|
| | Comonomer | I.V. | Amt., Wt. % | Clean | Oily |
| 74 (Control) | — | — | 0 | 6 | 5 |
| 75 | None | 0.10 | 20 | 20 | 16 |
| 76 | None | 0.28 | 20 | 26 | 21 |
| 77 | None | 0.58 | 20 | 32 | 26 |
| 78 | None | 0.72 | 20 | 37 | 29 |
| 79 | 10 Wt. % Acrylonitrile | 0.65 | 20 | 28 | 21 |
| 80 | 12 Wt. % α-Methylstyrene | 0.56 | 20 | 31 | 24 |
| 81 | 20 Wt. % Butadiene | 0.81 | 20 | 25 | 19 |
| 82 | 5 Wt. % Methyl acrylate | 0.52 | 20 | 26 | 17 |
| 83 | 15 Wt. % Vinyl acetate | 0.73 | 20 | 22 | 16 |

EXAMPLE 84

This example illustrates the utility of a blend of a dimer acid modified copolyester, a vinyl aromatic polymer, and an inert filler as a gap filler to replace lead solder. An extruded blend of poly(ethylene terephthalate) modified with 20 mole percent of dimer acid (I.V. 0.60), 15 weight percent polystyrene, and 30 weight percent iron metal powder (100 mesh) is used to overfill a 1½ × 3 × 3/16-inch depression in each of three steel panels preheated to 375°F. After cooling to room temperature, the panels are sanded almost flush without difficulty using a belt sander. The sanded surface is smooth and shows good feathering out properties. The sanded panels are then successively heated 30 minutes at 350°F., cooled to room temperature, cooled to −20°F. for 1 hour, and allowed to warm to room temperature. The filled areas on the panels show no evidence of cracking or loss of adhesion during these treatments.

Similar results are obtained when 15 weight percent iron powder is used instead of 30 percent, when 10 percent, 20 percent, or 30 percent by weight of talc powder is used instead of iron powder, when the polystyrene content is 10 percent or 20 percent instead of 15 percent, and when the panel is lightly coated with the two oils used earlier or with either of the following oils: Sunvis 975 lube oil marketed by Sun Oil, Regal Oil A heat exchanger oil marketed by Texaco, or Exxon Primol 355 marketed by Humble.

EXAMPLE 85

A copolyester of a glycol component of 10 mole percent ethylene glycol and 90 mole percent 1,4-butanediol and an acid component of 80 mole percent terephthalic acid and 20 mole percent dimer acid is prepared with an I.V. of 0.62 by conventional techniques and blended with poly(p-chlorostyrene) with an I.V. of 0.26. The blend contains 80% copolyester and 20% poly(p-chlorostyrene) by weight of the total blend. The blend has a melt viscosity of 560 poise (measured as above) and a peel strength of 22 on TF steel.

EXAMPLE 86

A copolyester of 1,4-butanediol, and an acid component of (1) 70 mole percent terephthalic acid and 15 mole percent isophthalic acid, and (2) 15 mole percent dimer acid is prepared with an I.V. of 0.65 by conventional techniques, and blended with poly($\alpha$-methylstyrene) having an I.V. of 0.34. The blend contains 80% copolyester and 20% poly($\alpha$-methylstyrene) by weight of the total blend. The adhesive composition has a melt viscosity of 510 poise at 240°C. and a shear rate of 500 sec.$^{-1}$. It has a peel strength of 26 on TF steel.

EXAMPLE 87

The composition of Example 19 of Table 1 is applied as a hot melt adhesive to an epoxy-phenolic coated metal substrate of the type used for the production of cans. The T-peel strength is found to be 35 lb./in. width. The composition of Example 5 containing no dimer acid component in the copolyester is found to have a T-peel strength on a similar epoxy-phenolic coated steel substrate of only 3 lb./in. width.

The term acid is used broadly herein and is intended to include ester-forming derivatives thereof. For example, "terephthalic acid" includes ester-forming derivatives thereof such as dimethyl terephthalate.

Although the invention has been described in considerable detail with particular reference to certain preferred embodiments thereof, variations and modifications may be effected within the spirit and scope of the invention.

We claim:

1. An adhesive composition comprising, based on the weight of the composition
   A. from about 50% to about 98% of a copolyester of
      1. a glycol component which is at least about 80 mole percent of a glycol having from 2 to 10 carbon atoms, and
      2. an acid component which is at least about 48 mole percent terephthalic acid or an ester-forming derivative thereof, and from about 5 to about 25 mole percent of a dimer acid, and
   B. from about 50% to about 2% of a vinyl aromatic polymer of which at least 50% by weight of its polymeric units are derived from at least one monomer having the formula

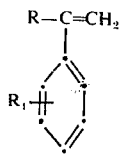

wherein R is hydrogen or an alkyl group containing 1 to 4 carbon atoms and R$_1$ is hydrogen, chlorine, phenyl or an alkyl group containing 1 to 4 carbon atoms.

2. An adhesive composition according to claim 1 wherein said glycol contains from 2 to 6 carbon atoms.

3. An adhesive composition according to claim 1 comprising, by weight of the composition, between about 60% and about 80% of said copolyester and between about 40% and about 20% of said vinyl aromatic polymer.

4. A composition according to claim 1 wherein said vinyl aromatic polymer is polystyrene.

5. A composition according to claim 2 wherein said vinyl aromatic polymer is polystyrene.

6. A composition according to claim 1 wherein said copolyester comprises between about 10% and about 30% dimer acid.

7. An adhesive composition comprising, based on the weight of the composition,
   A. from about 60% to about 80% of a copolyester of
      1. a glycol having from 2 to 6 carbon atoms,
      2. between 75 mole percent and 90 mole percent terephthalic acid, and
      3. between 25 mole percent and 10 mole percent dimer acid, and
   B. between about 40% and about 20% of a vinyl aromatic polymer derived from a monomer having the formula

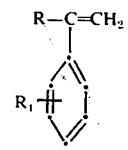

wherein R is hydrogen or an alkyl group containing 1 to 4 carbon atoms and R$_1$ is a member selected from the group consisting of hydrogen, chlorine, phenyl or an alkyl group containing 1 to 4 carbon atoms.

8. A composition according to claim 6 wherein said vinyl aromatic polymer is polystyrene.

9. An adhesive composition comprising, based on the weight of the composition,
   A. from about 50% to about 98% of a copolyester of
      1. a glycol component which is at least about 80 mole percent ethylene glycol, and
      2. an acid component which is at least about 48 mole percent terephthalic acid or an ester-forming derivative thereof, and from about 5 to about 25 mole percent of a dimer acid, and
   B. from about 50% to about 2% of a vinyl aromatic polymer of which at least 50% by weight of its polymeric units are derived from at least one monomer having the formula

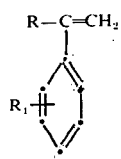

wherein R is hydrogen or an alkyl group containing 1 to 4 carbon atoms and R$_1$ is hydrogen, chlorine, phenyl or an alkyl group containing 1 to 4 carbon atoms.

10. An adhesive composition according to claim 9 comprising by weight of the composition between about 60% and about 80% of said copolyester and between about 40% and about 20% of said vinyl aromatic polymer.

11. An adhesive composition according to claim 10 wherein said vinyl aromatic polymer is polystyrene and said copolyester comprises between about 10% and about 30% dimer acid.

12. An adhesive composition according to claim 9 comprising, based on the weight of the composition,
   A. from about 60% to about 80% of a copolyester of
      1. ethylene glycol,
      2. between 75 mole percent and 90 mole percent terephthalic acid, and
      3. between 25 mole percent and 10 mole percent dimer acid, and
   B. between about 40% and about 20% polystyrene.

13. A substrate coated with an adhesive composition comprising, based on the weight of the composition,
   A. from about 50% to about 98% of a copolyester of
      1. at least 80 mole percent of a glycol having from 2 to 10 carbon atoms,
      2. at least 48 mole percent terephthalic acid or an ester-forming derivative thereof, and
      3. from about 5 to about 25 mole percent of a dimer acid, and
   B. from about 50% to about 2% of a vinyl aromatic polymer of which at least 50% by weight of its polymeric units are derived from at least one monomer having the formula

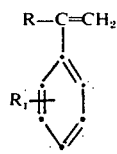

wherein R is hydrogen or an alkyl group containing 1 to 4 carbon atoms and $R_1$ is a member selected from the group consisting of hydrogen, chlorine, phenyl or an alkyl group containing 1 to 4 carbon atoms.

14. A substrate coated with an adhesive composition comprising, based on the weight of the composition,
   A. from about 60% to about 80% of a copolyester of
      1. a glycol containing from 2 to 6 carbon atoms,
      2. between 75 mole percent and 90 mole percent terephthalic acid, and
      3. between 25 mole percent and 10 mole percent dimer acid, and
   B. between about 40% and about 20% of a vinyl aromatic polymer derived from a monomer having the formula

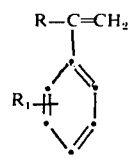

wherein R is hydrogen or an alkyl group containing 1 to 4 carbon atoms and $R_1$ is a member selected from the group consisting of hydrogen, chlorine, phenyl or an alkyl group containing 1 to 4 carbon atoms.

* * * * *